Dec. 18, 1962   M. KOTLER ET AL   3,069,649
PHOTOGRAPHIC APPARATUS

Filed May 27, 1960   2 Sheets-Sheet 1

Max Kotler
Robert V. Nicolosi
and
Mijtar Beio
INVENTORS

BY Brown and Mikulka
and
Robert J. Schiller
ATTORNEYS

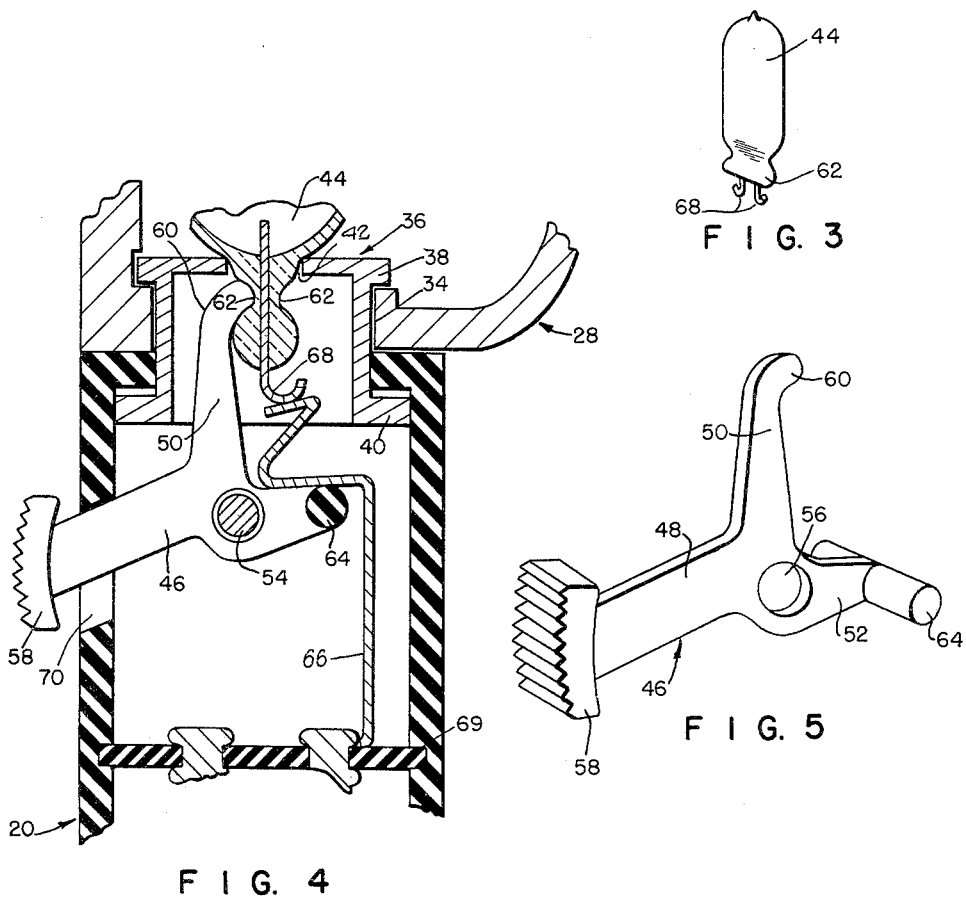

3,069,649
PHOTOGRAPHIC APPARATUS

Max Kotler, Seaford, Robert V. Nicolosi, Valley Stream, and Miftar Beio, Brentwood, N.Y., assignors to Polaroid Corporation, Cambridge, Mass., a corporation of Delaware
Filed May 27, 1960, Ser. No. 32,291
4 Claims. (Cl. 339—45)

This invention relates to illuminating devices and more particularly to a new and improved flash lamp.

A principal object of the present invention is to provide a flash lamp having a novel, easily operated lamp-bulb holder formed of a minimum of parts.

Another object of the present invention is to provide an inexpensive flash lamp adapted particularly for photographic use with a miniature type of flash bulb.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is illustrative of one form of flash bulb with which the invention is particularly well adapted for use;

FIG. 4 is a fragmentary cross section taken along the line 4—4 of FIGURE 1; and

FIG. 5 is a perspective view of one form of a bulb-locking and ejecting element of the embodiment of FIG. 4.

In general, the invention comprehends a flash lamp apparatus of the type known as battery-capacitance flash lamps which may be detachably mounted by suitable mounting means upon a photographic apparatus having an integral flash synchronizing means such as a shutter actuated discharge switch. The flash apparatus, in common with other flash units well known in the art, comprises a housing for supporting and protecting the electrical elements of the apparatus, and means for mounting the housing upon a camera so that the housing is in a substantially fixed alignment relative to the field of view of the camera. The flash apparatus also includes a reflecting means which is preferably mounted for movement with respect to the housing so as to direct light in a plurality of directions. A lamp bulb holding means is associated with the reflecting means and is adapted to releasably retain a flash lamp bulb of the vaporizable filament type in operative relation to the reflecting means. Also included in the flash lamp apparatus are the usual battery-capacitive electrical elements such as a power source or battery, an electrically capacitive element, a resistive element, and means for connecting the flash lamp apparatus with a synchronizing switch in the camera.

Figure 1:
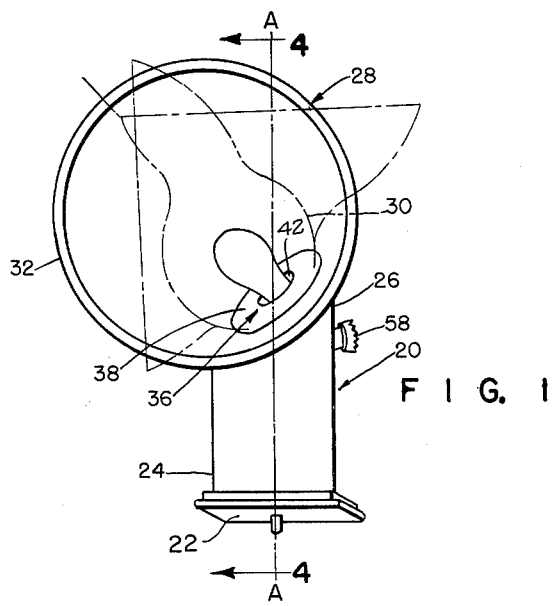
FIGURE 1 is a front perspective view of one embodiment of the invention.

Referring now to the drawings there is shown in FIGURE 1 a flash unit comprising a substantially hollow housing means such as casing 20 for enclosing and supporting electrical elements of unit. Casing 20 may be formed of any suitable material, preferably an electrically nonconducting substance such as substantially rigid artificial polymers, vulcanized rubber, or the like. Casing 20 is preferably formed as a substantially hollow cylindrical member having a cylindrical axis A—A. As a means for mounting casing 20 upon a camera, there is provided a mounting foot or jack 22 preferably disposed at one end 24 of the casing. Jack 22 is constructed and shaped for insertion into the usual mounting clip of a camera for firmly and releasably retaining the casing in a substantially fixed relation to the camera, and also for electrically completing a circuit between the electrical elements contained within casing 20 and a shutter synchronized switch means known in the art and contained within the camera. The structural details of jack 22 are preferably similar to those which comprise the mounting foot disclosed in the copending U.S. application, Serial No. 743,657, filed June 23, 1958 by Edison R. Brandt.

Mounted adjacent the opposite end 26 of casing 20 is a means, such as reflector 28, for reflecting and directing light. In the preferred embodiment, reflector 28 comprises an open-ended, hollow element having a roughly bowl-shaped configuration with a vertex 30 at one end, the open end of the element having a periphery 32 which is preferably in a single plane. The interior of reflector 28 is, of course, provided with a surface having a high albedo. Disposed adjacent vertex 30 and to one side thereof is a means such as circular aperture 34, for providing a pivotal axis for the reflector, which axis is preferably colinear with the cylindrical axis A—A.

As shown particularly in FIG. 4, disposed within aperture 34 is a lamp bulb holding means 36 which is preferably shaped as a cylindrical socket having a first flange 38 adjacent one end and a second flange 40 adjacent its opposite end. Socket 36 is dimensioned to fit snugly within aperture 34 with flange 38 extending interiorly of reflector 28, thereby holding the socket within the reflector. Flange 40 extends interiorly of the open end 26 of casing 20 for locking the socket therein. It will thus be seen that while the reflector is rotatable about socket 36, it is nevertheless firmly affixed to end 26 of the casing. Socket 36 is provided approximately centrally of flange 38 with an aperture 42, the latter being so shaped and adapted as to receive the base of a miniature type of vaporizable flash bulb 44, such as the type AG-1 (shown in FIG. 3 for the purposes of illustration only) produced by both Sylvania Electric Products Company and The General Electric Company.

In the preferred embodiment, reflector 28 is rotatable about socket 36 into at least three positions (two of which are shown in broken lines in FIGURE 1) wherein light from reflector 28 is directed in three corresponding directions which are mutually and approximately perpendicular to one another. Jack 22 and reflector 28 are so mounted upon casing 20 that one of the three aforesaid directions is substantially parallel with the optical axis of the camera upon which the flash lamp is intended to be mounted. A reflecting means pivotable to a plurality of directions in this manner, and the details of the structure thereof, is disclosed in the copending application U.S. Serial No. 753,784, filed August 7, 1958 by Sidney B. Whittier.

Also disposed within end 26 of the casing is a means such as member 46 for releasably locking and for ejecting bulb 44 from aperture 42. As shown in FIG. 5, member 46 is preferably formed as a Y-shaped element having a first arm 48, a second arm 50, and a third arm 52 all preferably extending in a common plane. Element 46 is mounted for rotation in this common plane about suitable bearing means such as axle 54 which is mounted transversely of axis A—A and extends interiorly from one side to the other of the casing. Element 46 is provided adjacent the common juncture of its three arms with an aperture or hole 56 in which axle 54 is disposed. Arm 48 is provided at the free end thereof with a manually engageable portion 58. Arm 50 is provided adjacent the free end thereof with a hook or engaging portion 60 adapted to releasably engage groove 62 which is found formed at the base of bulb 44. Arm 52 is provided at the free end thereof with elongated means such as rod 64 for effecting the ejection of bulb 44 from the socket. Rod 64, in the form shown, is positioned so that its elongated dimension extends substantially perpendicularly of the plane of rotation of element 46 about axle 54.

Also disposed within the interior of casing 20 are means, such as a pair of leads 66 (only one of which is shown in FIG. 4, both leads being shown schematically in FIG. 2) having a dual function. One end of each of leads 66 is located adjacent aperture 42 such that insertion of bulb 44 into the aperture causes the base electrodes 68 of the bulb to engage the leads. Because leads 66 are formed of electrically conductive material, the leads therefore serve as means for providing electrical continuity between the flash gun electrical elements and the bulb.

Leads 66 additionally serve a mechanical function. In the preferred form, the leads are elongated, strip-like elements made of a resilient material such as bronze, the ends of the leads adjacent aperture 42 being in a Z-shaped configuration. The opposite ends of leads 66 are anchored upon an insulated cross-member 69 positioned adjacent end 24 of casing 20. Member 69 also supports electrical junctions at which the leads are connected to appropriate portions of an electrical network described hereinafter.

Axle 54 is disposed and member 46 is dimensioned and shaped such that member 46 cooperates mechanically with leads 66 in the following manner. Manually engageable portion 58 of member 46 extends through aperture 70 provided in one side of casing 20 intermediate its ends, portion 58 therefore being manually engageable outside of the casing. Arm 52 is located adjacent leads 66 so that when bulb 44 is inserted into aperture 42, bringing base electrodes 68 into engagement with the Z-shaped configuration of the leads, the pressure of the insertion resiliently deforms the leads and moves the Z-shape into eengagement with rod 64, causing element 46 to rotate in a clockwise direction according to the view of FIG. 4. The clockwise rotation of element 46 moves arm 50 into a position wherein portion 60 engages groove 62 and is retained therein by the pressure of the leads against rod 64. Release of the small force exerted upon the bulb by the operator finds the bulb releasably locked in operative position in aperture 42 by this engagement of portion 60 with groove 62.

To release the bulb, pressure exerted by an operator against manually engageable portion 58 rotates member 46 about axle 54 counterclockwise, forcing rod 64 against leads 66 to overcome the bias of the leads and therefore exerting resilient pressure against the base of bulb 44. Substantially simultaneously, this rotation of member 46 moves engageable portion 60 out of engagement with groove 62, thereby allowing the resilient pressure of leads 66 to force the bulb axially out of socket 36, freeing the latter for the next bulb insertion.

Figure 2:
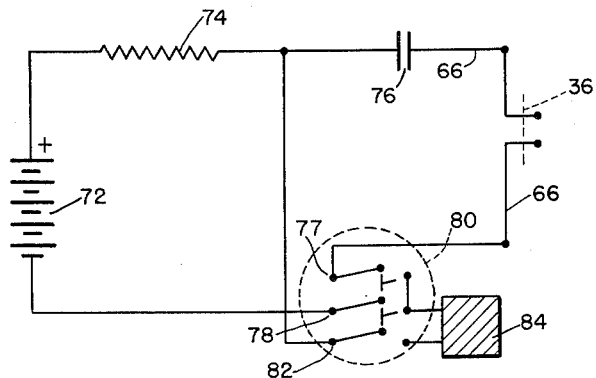
FIG. 2 is a diagrammatic circuit showing one form of the disposition of electrical elements used with the embodiment of FIGURE 1.

Means are included for powering light bulb 44, one example being shown schematically in the circuit of FIG. 2. As may be seen, there is included the usual electrical power source such as battery 72 connected to an electrically resistive element such as resistor 74, the resistor in turn being connected to one side of an electrically capacitive element such as condenser 76. The opposite terminal of the battery is connected to terminal 78 of a mounting switch means indicated generally by the reference numeral 80. A second element 77 of switch means 80 comprises the portion of the mounting jack which is connected to one lead 66 and therefore to the bulb socket shown schematically at 36. The other side of condenser 76 is connected by the other lead 66 to bulb socket 36. One side of condenser 76 is also connected to a third element 82 of switch means 80. A shutter actuated, flash-synchronizer switch 84, of a camera upon which the unit is adapted to be mounted, is so connected to switch means 80 that upon insertion of jack 22 into the mounting clip on the camera switch means 80 is closed. As known in the art, the engagement of the jack with the clip both completes a charging circuit and also completes a circuit which includes flash-synchronizer switch 84 of the camera, thereby allowing condenser 76 to be discharged upon actuation of the flash-synchronizer switch by operation of the shutter camera. Additionally, the engagement of the jack and the camera mounting clip mechanically aligns casing 20 with respect to the camera so that reflector 28, when in one of its aforesaid positions, directs light along a path substantially parallel with the optical axis of the camera lens system.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photoflash device, a lamp bulb holding and ejecting device comprising, in combination, a pair of resilient electrical connectors extending from an anchored position on said device and having a portion positioned for engagement with respective base terminals of a flash bulb, said connectors being movable by said engagement with said base terminals from a rest position to a displaced position wherein said connectors are tensioned to exert a bias against said terminals tending to eject said bulb from said device and a pivotally mounted locking element having a first portion located in the path of movement of said connectors and engageable by said connectors upon movement of the latter to said displaced position for rotating said locking element in a first direction, said locking element having a second portion thereof movable into engagement with a base portion of said bulb upon rotation of said locking element in said first direction, said locking element having a third portion thereof which is manually engageable for rotating said locking element in an opposite direction so as to move said second portion out of engagement with said base portion.

2. In a photoflash device, a lamp bulb holding and ejecting device comprising, in combination, a pair of resilient electrical connectors extending from an anchored position on said device and having a portion positioned for engagement with base terminals of a flash bulb, said connectors being movable by engagement with said base terminals from a rest position to a displaced position wherein said connectors are tensioned to exert a bias against said terminals tending to eject said bulb from said device, a locking element mounted for movement between a first position wherein a portion of said locking element is engageable with a base portion of said bulb for retaining the latter against the bias of said connectors and a second position wherein said portion of said element is out of engagement with said base portion, said locking element being engageable by and biased into said first position by said connectors when the latter are tensioned, and manually engageable means for moving said locking element from said first position toward said second position for increasing the bias of said connectors against said bulb and for disengaging said portion of said locking element from said base portion of said bulb, thereby allowing the resilient bias of said connectors to eject said flash bulb from said photoflash device.

3. A lamp bulb holding and ejecting device as defined in claim 2 wherein said locking element includes an elongated portion extending substantially perpendicularly of the path of movement of said locking element, and which is positioned in the path of movement of said connectors, said elongated portion being engageable by said connectors for moving said locking element into said first position.

4. A lamp bulb holding and ejecting device as defined in claim 2 wherein said locking element comprises a Y- shaped element having three arms, the extremity of a first of said arms constituting said manually engageable means, the extremity of a second of said arms being engageable with said connectors, and the extremity of the third of said arms constituting said portion of said locking element which is engageable with said base portion of said bulb.

References Cited in the file of this patent

UNITED STATES PATENTS

| | | |
|---|---|---|
| 1,934,105 | Totty | Nov. 7, 1933 |
| 2,308,016 | Mihalyi | Jan. 12, 1943 |
| 2,812,420 | Bing et al. | Nov. 5, 1943 |
| 2,863,988 | Schwartz et al. | Dec. 9, 1958 |